(12) United States Patent
Becker et al.

(10) Patent No.: US 8,470,479 B2
(45) Date of Patent: Jun. 25, 2013

(54) SENSORLESS RELATIVE HUMIDITY CONTROL IN A FUEL CELL APPLICATION

(75) Inventors: Marc Becker, Idstein (DE); Oliver Maier, Worms (DE); Peter Willimowski, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 2339 days.

(21) Appl. No.: 11/304,198

(22) Filed: Dec. 15, 2005

(65) Prior Publication Data

US 2007/0141412 A1 Jun. 21, 2007

(51) Int. Cl.
*H01M 8/06* (2006.01)
(52) U.S. Cl.
USPC .......................................... 429/413; 429/408
(58) Field of Classification Search
USPC ............................................................ 429/22
See application file for complete search history.

(56) References Cited

U.S. PATENT DOCUMENTS

| | | | | |
|---|---|---|---|---|
| 6,067,844 | A * | 5/2000 | Westbrook et al. | 73/40.5 R |
| 6,102,037 | A * | 8/2000 | Koch | 128/203.26 |
| 6,635,374 | B1 * | 10/2003 | Aramaki | 429/24 |
| 6,777,120 | B2 * | 8/2004 | Nelson et al. | 429/22 |
| 2001/0010875 | A1 | 8/2001 | Katagiri | |
| 2002/0039674 | A1 * | 4/2002 | Suzuki et al. | 429/30 |
| 2004/0013929 | A1 * | 1/2004 | Hsu et al. | 429/34 |
| 2005/0221134 | A1 * | 10/2005 | Liu et al. | 429/13 |
| 2006/0134472 | A1 * | 6/2006 | Bach et al. | 429/13 |

OTHER PUBLICATIONS

Chopey, Nicholas P. Handbook of Chemical Engineering Calculations (3rd Edition). (pp. 2.1-2.3). McGraw-Hill. (2004).*
U.S. Appl. No. 11/112,102, filed Apr. 22, 2005, Volker Formanski et al.
U.S. Appl. No. 10/623,991, filed Jul. 21, 2003, Volker Formanski et al.
Chen Dongmei, Modeling and Simulation of a PEM Fuel Cell Humidification System, Proceeding of the 2004 American Control Conference, Boston, Massachusetts, Jun. 30-Jul. 2, 2004 pp. 822-827.

* cited by examiner

*Primary Examiner* — Ula C Ruddock
*Assistant Examiner* — Jacob Marks
(74) *Attorney, Agent, or Firm* — John A. Miller; Miller IP Group, PLC

(57) ABSTRACT

A technique for determining the relative humidity of the cathode input airflow to a fuel cell stack that eliminates the need for a dew-point sensor. The cathode input airflow is humidified by a water vapor transfer unit that uses water in the cathode exhaust gas. The technique employs an algorithm that determines the flow of water into the cathode inlet of the stack. In one embodiment, the algorithm determines the volume flow of water through the water vapor transfer unit using the Arrhenius equation, and then converts the water volume flow to a water mole flow. The algorithm then uses the water mole flow through the water vapor transfer unit and the water mole flow of ambient air to determine the water mole flow into the cathode inlet. The algorithm then uses the water mole flow into the cathode inlet to determine the relative humidity of the cathode airflow.

20 Claims, 1 Drawing Sheet

SENSORLESS RELATIVE HUMIDITY CONTROL IN A FUEL CELL APPLICATION

BACKGROUND OF THE INVENTION

1. Field of the Invention

This invention relates generally to a technique for determining the relative humidity of a cathode input airflow to a fuel cell stack and, more particularly, to a technique for determining the relative humidity of a cathode input airflow to a fuel cell stack that includes determining water flow through a water vapor trap unit that humidities the cathode input airflow.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. For example, a typical fuel cell stack for a vehicle may have two hundred or more stacked fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The membranes within a fuel cell stack need to have a certain relative humidity so that the ionic resistance across the membrane is low enough to effectively conduct protons. If the wetness of the membranes is not at or near an optimum level, then the durability of the membranes is reduced. Therefore, to help maintain membrane relative humidity, it is known in the art to humidify the cathode airflow to the cathode side of the stack.

As mentioned above, water is generated as a by-product of the stack operation. Therefore, the cathode exhaust from the stack will include water vapor and liquid water. It is known in the art to use a water vapor transfer (WVT) unit to capture some of the water in the cathode exhaust, and use the separated water to humidify the cathode airflow input.

FIG. 1 is a schematic diagram of a fuel cell system 10 that humidifies a cathode input airflow to a fuel cell stack 12 in this manner. A compressor 14 provides a compressed airflow on line 16 to the cathode side of the stack 12. A humidified cathode exhaust gas is provided on line 18 at the output of the cathode side of the stack 12. The airflow from the compressor 14 on the line 16 is directed through one side of a WVT unit 20 and the cathode exhaust gas on the line 18 is directed through another side of the WVT unit 20. The WVT unit 20 includes permeation membranes or other porous materials, as is well understood in the art, that collects water vapor and liquid water in the cathode exhaust gas and uses this water to humidify the airflow to the cathode input.

The relative humidity of the cathode airflow and the pressure within the fuel cell stack 12 need to be tightly controlled for proper fuel cell stack operation. The mass flow of the water transferred through the WVT unit 20 depends on the partial pressure of the water, the flow of air through the WVT unit 20 and other system parameters. To control the relative humidity and pressure, proportional control valves 22 and 24 are selectively opened and closed to direct the cathode exhaust gas through the WVT unit 20 or by-pass the WVT unit 20 on a by-pass line 26.

A dew-point sensor 28 measures the relative humidity of the cathode airflow into the stack 12 on line 16, and that value in combination with the stack operating conditions, such as current density, temperature, pressure, etc., determines the position of the control valves 22 and 24 so that the proper relative humidity is provided for the cathode input airflow. A first temperature sensor 30 measures the temperature of the airflow in the line 16 and a second temperature sensor 32 measures the temperature of the cathode exhaust gas in the line 18. A pressure sensor 34 measures the pressure in the inlet line 16, and a mass flow meter 36 measures the flow of air from the compressor 14. These values and other system operating parameters are used to control the operation of the system 10, as is well understood in the art.

As mentioned above, the dew-point sensor 28 determines the relative humidity of the cathode input airflow. However, the known dew-point sensors used for this purpose have a number of disadvantages that affect the ability to accurately determine the relative humidity of the cathode input airflow. Particularly, dew-point sensors that provide the required accuracy are not standard in automotive applications. Further, these sensors are relatively expensive, have low reliability and require analog control inputs. Also, the known dew-point sensors have problems with transient behavior and do not provide accurate readings if a droplet of water forms on the sensor contacts. It is therefore desirable to provide a different technique for determining the relative humidity of the cathode input airflow that does not require a sensor.

SUMMARY OF THE INVENTION

In accordance with the teachings of the present invention, a technique for determining the relative humidity of the cathode input airflow to a fuel cell stack is disclosed that eliminates the need for a dew-point sensor. The cathode input airflow is humidified by a water vapor transfer unit that uses water in the cathode exhaust gas. The technique employs an algorithm that determines the flow of water into the cathode inlet of the stack. In one embodiment, the algorithm determines the volume flow of water through the water vapor transfer unit using the Arrhenius equation, and then converts the water volume flow to a water mole flow. The algorithm then uses the water mole flow through the water vapor transfer unit and the water mole flow of ambient air to determine the water mole flow into the cathode inlet. The algorithm then uses the water mole flow into the cathode inlet to determine the relative humidity of the cathode air flow.

Additional features of the present invention will become apparent from the following description and appended claims, taken in conjunction with the accompanying drawings.

DETAILED DESCRIPTION OF THE EMBODIMENTS

Figure 1:
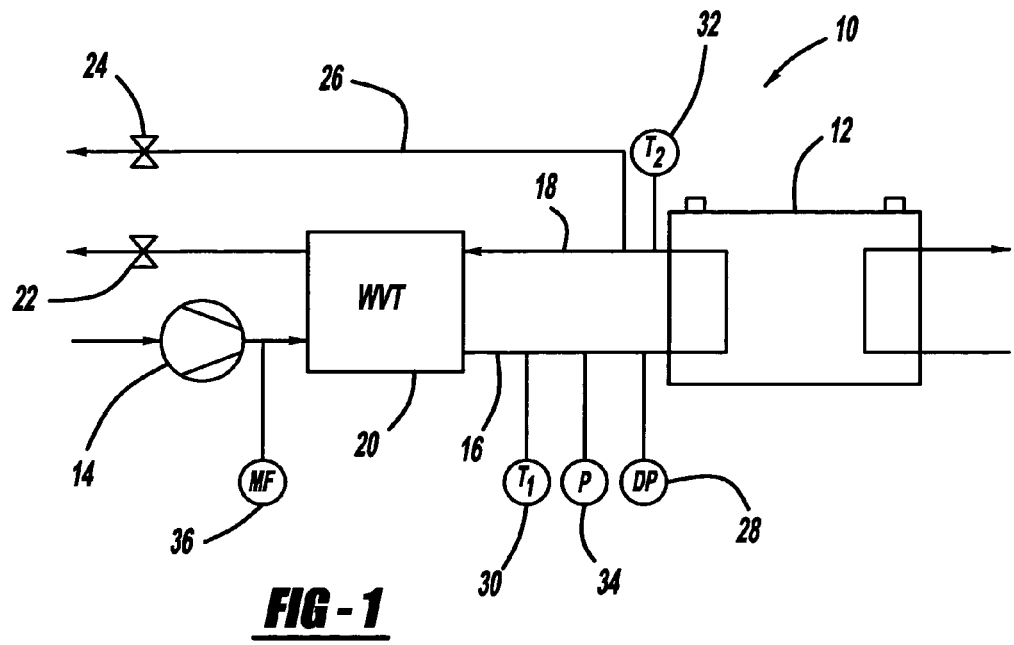
FIG. 1 is a schematic diagram of a fuel cell system that employs a water vapor trap unit for humidifying a cathode input airflow.

The following discussion of the embodiments of the invention directed to a technique for modeling a water vapor trap unit in a fuel cell system to determine the relative humidity of a cathode input airflow is merely exemplary in nature, and is in no way intended to limit the invention or its applications or uses.

According to the present invention, a method for estimating the transferred flow of the water through the WVT unit 20 is disclosed that can be used to determine the relative humidity of the cathode input airflow to the stack 12 on the line 16. From the transferred water flow estimation, the temperature of the airflow, the pressure in the input line 16 and the position of the control valves 22 and 24, the relative humidity of the cathode input airflow can be calculated. By adding the product water mass flow to the cathode airflow, the estimation of the stack outlet relative humidity can be determined by knowing the temperature and pressure. The flow distribution of the cathode exhaust controlled by the valves 22 and 24 influences the water mass flow through the WVT unit 20, which is in relationship to the transferred water mass flow.

It is necessary that the algorithm that determines the relative humidity of the cathode airflow works in real time. Because of this, the model of the WVT unit 20 has to be simple. The main physical effect of the water transfer through the WVT unit 20 is based on permeation which is determined only for water, but not for gasses. Therefore, nitrogen and oxygen permeation can be neglected.

To determine the water flow through the WVT unit 20 according to the invention, the Arrhenius equation (1) is used. The Arrhenius equation is a well known equation that provides a relationship between the rate a reaction proceeds and its temperature.

$$\dot{V}_{H_2O,perm,norm} = \frac{dp_{H_2O} * A_{Mem} * P_0 * e^{\left(\frac{-E}{R*(273.15+T_{mean})}\right)}}{S_{Mem}} \quad (1)$$

Where $\dot{V}_{H_2O,perm,norm}$ is the volume flow of water through the membrane in the WVT unit 20 in m³/s, $dp_{H_2O}$ is the water partial pressure difference between the stack inlet and the stack outlet, $A_{mem}$ is the area of the membrane in the WVT unit 20, $P_0$ is the Arrhenius gain, E is the activation energy, R is the universal gas constant, $T_{mean}$ is the average temperature between the stack cathode inlet and the stack cathode outlet, and $S_{mem}$ is the thickness of the membrane in the WVT unit 20. The water partial pressure difference between the stack inlet and the stack outlet is calculated based on the pressure at the inlet of the stack 12, the pressure drop across the stack 12 and the mass flow of the air through the stack. The Arrhenius gain and the activation energy are constants that are determined from the material of the membrane in the WVT unit 20.

The transferred water volume flow $\dot{V}_{H_2O,perm,norm}$ through the WVT unit 20 can be converted to the mole flow of water through the WVT unit 20 by equation (2) below.

$$\dot{n}_{H_2O,perm} = \dot{V}_{H_2O,perm,norm} * \frac{p_{norm}}{R*273.15} * K_{wet}(rH_{stack\ out}) \quad (2)$$

Where $\dot{n}_{H_2O,perm}$ is the water mole flow, $p_{norm}$ is the normalized ambient pressure in the stack 12, which is a known constant, $K_{wet}$ is the gain related to the stack outlet relative humidity and $rH_{Stack\ out}$ is the relative humidity of the cathode exhaust from the stack 12. Typically the value $K_{wet}$ is a constant, but can be calculated based on the relative humidity of the cathode exhaust gas. The relative humidity of the cathode exhaust $rH_{Stackout}$ is determined by water balancing. Particularly, the humidity of the airflow through the compressor 14 is known and the volume flow of water through the membrane of the WVT unit 20 is calculated by equation (1). These values are added to determine the amount of water that enters the stack 12, and the product water generated in the stack 12 is then added to that value to give the relative humidity of the cathode exhaust gas.

In order to calculate the stack inlet relative humidity, the balance of the water mole flow through the WVT unit 20 is determined by:

$$\dot{n}_{H_2O,stack\ in} = \dot{n}_{H_2O,perm} + \dot{n}_{H_2O,ambient} \quad (3)$$

Where $\dot{n}_{H_2O,ambient}$ is the water mole flow of ambient air and $\dot{n}_{H_2O,stack\ in}$ is the water mole flow at the stack cathode inlet, which is the sum of the transferred and ambient water mole flow. Particularly, the water mole flow of ambient air introduced into the compressor 14 is added to the water mole flow of the water flowing through the membrane in the WVT unit 20 to determine the water mole flow into the stack 12. The water mole flow of the ambient air is determined based on location.

The relative humidity at the stack cathode inlet should be less than or equal to 1, and can be calculated using equations (1)-(3) as:

$$rH_{stack\ in} = \frac{p_{stack\ in} \frac{\dot{n}_{H_2O,stack\ in}}{\dot{n}_{total,stack\ in}}}{p_{sat}(T_{ref})} \quad (4)$$

Where $p_{stack\ in}$ is the stack inlet pressure, $\dot{n}_{total,stack\ in}$ is the total mole flow of water and gasses at the stack cathode inlet and $p_{sat}(T_{ref})$ is the water saturation pressure at a reference temperature. The total mole flow at the stack cathode inlet is the combination of the mole flow of the gases and the water that flows into the stack 12. This value can be estimated based on the speed of the compressor 14, or can be calculated by the measured flow from the mass flow sensor 36. The water saturation pressure is the pressure at which the airflow will be completely saturated with water where it cannot accept any more water, which is dependent on the temperature at the inlet of the stack 12. The water saturation pressure is defined for the temperature.

The various temperature and pressure values used in equations (1)-(4) can be provided by the sensors identified in the system 10, or can be estimated by a simulation model, as would be well understood by those skilled in the art.

Figure 2:
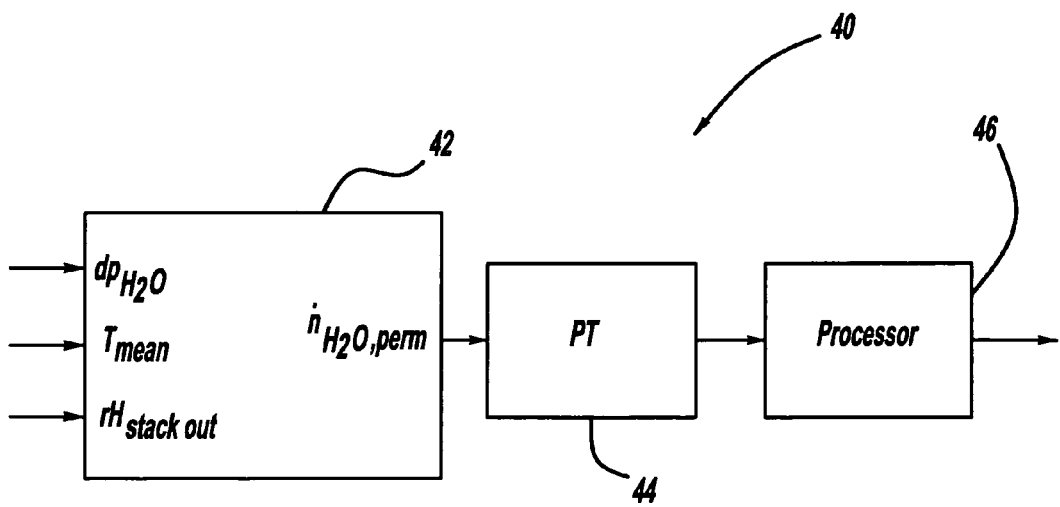
FIG. 2 is a block diagram of a system for an algorithm of the invention that models the water vapor trap unit shown in FIG. 1 to determine the relative humidity of the cathode input airflow.

FIG. 2 is a block diagram of a system 40 for determining the relative humidity of the cathode input airflow as discussed above. The system 40 includes a permeation calculation processor 42 that receives the water partial pressure difference between the stack cathode inlet and the stack cathode outlet value $dp_{H_2O}$, the mean temperature between the stack cathode inlet and the cathode outlet value $T_{mean}$ and the relative humidity at the stack cathode outlet value $rH_{stack\ out}$. The processor 42 uses these values and equations (1) and (2) to determine the water mole flow or transferred water flow value $\dot{n}_{H_2O,perm}$. The water mole flow value $\dot{n}_{H_2O,perm}$ is sent to a $PT_1$ element processor 44 that simulates the time delay for the water transfer inside of the WVT unit 20. A $PT_1$ element processor is similar to a first order filter. If it is necessary, a higher order filter can also be used. Particularly, there is some delay from when the water flow on the wet side of the membrane in the WVT unit 20 is able to be transferred to the air flowing through the dry side of the membrane of the WVT unit 20. The PT processor 44 provides a damping factor for this delay. From this value, a processor 46 calculates the relative humidity of the stack inlet using equations (3) and (4).

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the relative humidity of a cathode inlet airflow to a fuel cell stack, said cathode inlet airflow being humidified by a water vapor transfer unit, said method comprising:
   determining the flow of water through the water vapor transfer unit;
   determining the flow of water into the cathode inlet by balancing the flow of water through the water vapor transfer unit and a flow of water in ambient air; and
   determining the cathode inlet airflow relative humidity using the flow of water into the cathode inlet.

2. The method according to claim 1 wherein determining the flow of water through the water vapor transfer unit includes using characteristics of a permeation membrane in the water vapor transfer unit.

3. The method according to claim 1 wherein determining the flow of water through the water vapor transfer unit includes determining the volume flow of water through the water vapor transfer unit and then determining the mole flow of water through the water vapor transfer unit using the volume flow of water through the water vapor transfer unit.

4. The method according to claim 3 wherein determining the volume flow of the water through the water vapor transfer unit includes using the equation:

$$\dot{V}_{H_2O,perm,norm} = \frac{dp_{H_2O} * A_{Mem} * P_0 * e^{\left(\frac{-E}{R*(273.15+T_{mean})}\right)}}{S_{Mem}}$$

where $\dot{V}_{H_2O,perm,norm}$ is the water volume flow, $dp_{H_2O}$ is the water partial pressure difference between the cathode inlet and a cathode outlet, E is the area of a membrane within the water vapor transfer unit, $P_0$ is an Arhennius gain value, E is an activation energy value, R is a gas constant, $T_{mean}$ is the mean temperature between the cathode inlet and the cathode outlet and $s_{mem}$ is the thickness of the membrane.

5. The method according to claim 4 wherein determining the mole flow of water through the water vapor transfer unit includes using the equation:

$$\dot{n}_{H_2O,perm} = \dot{V}_{H_2O,perm,norm} * \frac{p_{norm}}{R*273.15} * K_{wet}(rH_{stack\ out})$$

where $\dot{n}_{H_2O,perm}$ is the water mole flow through the water vapor transfer unit, $\dot{V}_{H_2O,perm,norm}$ is the volume flow of water through the water vapor transfer unit, $p_{norm}$ is a normalized ambient pressure value, $K_{wet}$ is a gain related to the cathode outlet relative humidity and $rH_{stack\ out}$ is the relative humidity of the cathode outlet.

6. The method according to claim 5 wherein determining the flow of water into the cathode inlet includes determining the water mole flow into the cathode inlet using the equation:

$$\dot{n}_{H_2O,stack\ in} = \dot{n}_{H_2O,perm} + \dot{n}_{H_2O,ambient}$$

where $n_{H_2O,stack\ in}$ is the water mole flow into the stack cathode inlet, $\dot{n}_{H_2O,perm}$ is the mole flow of the water through the water vapor transfer unit and $\dot{n}_{H_2O,ambient}$ is the water mole flow of ambient air.

7. The method according to claim 6 wherein calculating the relative humidity includes using the equation:

$$rH_{stack\ in} = \frac{p_{stack\ in}\frac{\dot{n}_{H_2O,stack\ in}}{\dot{n}_{total,stack\ in}}}{p_{sat}(T_{ref})}$$

where $rH_{stack\ in}$ is the relative humidity of the cathode inlet airflow, $p_{stack\ in}$ is the pressure at the cathode inlet, $\dot{n}_{total,stack\ in}$ is the total mole flow into the cathode inlet and $p_{sat}(T_{ref})$ is the water saturation pressure at a reference temperature.

8. A method for determining the relative humidity of a cathode inlet airflow to a fuel cell stack, said cathode inlet airflow being humidified by a water vapor trap transfer unit, said method comprising:
   determining the volume flow of water through the water vapor transfer unit;
   determining the mole flow of water through the water vapor transfer unit using the volume flow of water through the vapor transfer unit;
   determining the mole flow of water into the cathode inlet to the stack using the mole flow of water through the water vapor transfer unit and the mole flow of water in ambient air; and
   determining the cathode inlet airflow relative humidity using the water mole flow into the cathode inlet.

9. The method according to claim 8 wherein determining the volume flow of water includes using characteristics of a permeation membrane in the water vapor transfer unit.

10. The method according to claim 8 wherein determining the volume flow of the water through the water vapor transfer unit includes using the equation:

$$\dot{V}_{H_2O,perm,norm} = \frac{dp_{H_2O} * A_{Mem} * P_0 * e^{\left(\frac{-E}{R*(273.15+T_{mean})}\right)}}{S_{Mem}}$$

where $\dot{V}_{H_2O,perm,norm}$ is the water volume flow through the water vapor transfer unit, $dp_{H_2O}$ is the water partial pressure difference between the cathode inlet and a cathode outlet, E is the area of a membrane within the water vapor transfer unit, $P_0$ is an Arhennius gain value, E is an activation energy value, R is a gas constant, $T_{mean}$ is the mean temperature between the cathode inlet and the cathode outlet and $s_{mem}$ is the thickness of the membrane.

11. The method according to claim 8 wherein determining the mole flow of water through the vapor transfer unit includes using the equation:

$$\dot{n}_{H_2O,perm} = \dot{V}_{H_2O,perm,norm} * \frac{p_{norm}}{R*273.15} * K_{wet}(rH_{stack\ out})$$

where $n_{H_2O,perm}$ is the water mole flow through the water vapor transfer unit, $\dot{V}_{H_2O,perm,norm}$ is the water volume flow of the water vapor transfer unit, $p_{norm}$ is a normalized ambient pressure value, $K_{wet}$ is a gain related to stack outlet relative humidity and $rH_{stack\ out}$ is the relative humidity of a cathode outlet.

12. The method according to claim 8 wherein determining the mole flow water at the cathode inlet includes using the equation:

$$\dot{n}_{H_2O,stack\ in} = \dot{n}_{H_2O,perm} + \dot{n}_{H_2O,ambient}$$

where $n_{H_2O,stack\ in}$ is the water mole flow into the cathode inlet, $\dot{n}_{H_2O,perm}$ is the mole flow of the water through the water vapor transfer unit and $\dot{n}_{H_2O,ambient}$ is the water mole flow of ambient air.

13. The method according to claim 8 wherein calculating the relative humidity includes using the equation:

$$rH_{stack\ in} = \frac{p_{stack\ in} \frac{\dot{n}_{H_2O,stack\ in}}{\dot{n}_{total,stack\ in}}}{p_{sat}(T_{ref})}$$

where $rH_{stack\ in}$ is the relative humidity of the cathode inlet airflow, $p_{stack\ in}$ is the pressure at the cathode inlet, $\dot{n}_{total,stack\ in}$ is the total mole flow at the cathode inlet and $p_{sat}(T_{ref})$ is the water saturation pressure at a reference temperature.

14. A fuel cell system comprising:
a fuel cell stack including a cathode inlet and a cathode outlet;
a water vapor transfer unit for humidifying a cathode inlet airflow sent to the cathode inlet; and
a controller for determining the relative humidity of the cathode inlet airflow, said controller determining a flow of water through the water vapor transfer unit, determining a flow of water into the cathode inlet using the flow of water through the water vapor transfer unit and a flow of water through ambient air, and calculating the relative humidity at the cathode inlet using the flow of water into the cathode inlet.

15. The system according to claim 14 wherein the controller determines the flow of water through the water vapor transfer unit using characteristics of a permeation membrane in the water vapor transfer unit.

16. The system according to claim 14 wherein the controller determines the flow of water through the water vapor transfer unit by determining the volume flow of water through the water vapor transfer unit and then determining the mole flow of water through the water vapor transfer unit using the volume flow of water through the water vapor transfer unit.

17. The system according to claim 16 wherein the controller determines the volume flow of the water through the water vapor transfer unit using the equation:

$$\dot{V}_{H_2O,perm,norm} = \frac{dp_{H_2O} * A_{Mem} * P_0 * e^{\left(\frac{-E}{R*(273.15+T_{mean})}\right)}}{S_{Mem}}$$

where $\dot{V}_{H_2O,perm,norm}$ is the water volume flow through the water vapor transfer unit, $dp_{H_2O}$ is the water partial pressure difference between the cathode inlet and the cathode outlet, E is the area of a membrane within the water vapor transfer unit, $P_0$ is an Arhennius gain value, E is an activation energy value, R is a gas constant, $T_{mean}$ is the mean temperature between the cathode inlet and the cathode outlet and $s_{mem}$ is the thickness of the membrane.

18. The system according to claim 17 wherein the controller determines the mole flow of water through the water vapor transfer unit using the equation:

$$\dot{n}_{H_2O,perm} = \dot{V}_{H_2O,perm,norm} * \frac{p_{norm}}{R*273.15} * K_{wet}(rH_{stack\ out})$$

where $n_{H_2O,perm}$ is the water mole flow, $\dot{V}_{H_2O,perm,norm}$ is the water volume flow of the water vapor trap, $p_{norm}$ is a normalized ambient pressure value, $K_{wet}$ is a gain related to stack outlet relative humidity and $rH_{stack\ out}$ is the relative humidity of the stack cathode outlet.

19. The system according to claim 18 wherein the controller determines the mole flow water into the cathode inlet using the equation:

$$\dot{n}_{H_2O,stack\ in} = \dot{n}_{H_2O,perm} + \dot{n}_{H_2O,ambient}$$

where $n_{H_2O,stack\ in}$ is the water mole flow into the cathode inlet, $\dot{n}_{H_2O,perm}$ is the mole flow of the water through the water vapor transfer unit and $\dot{n}_{H_2O,ambient}$ is the water mole flow of ambient air.

20. The system according to claim 19 wherein the controller calculates the relative humidity using the equation:

$$rH_{stack\ in} = \frac{p_{stack\ in} \frac{\dot{n}_{H_2O,stack\ in}}{\dot{n}_{total,stack\ in}}}{p_{sat}(T_{ref})}$$

where $rH_{stack\ in}$ is a the relative humidity of the cathode inlet airflow, $p_{stack\ in}$ is the pressure at the cathode inlet, $\dot{n}_{total,stack\ in}$ is the total mole flow into the cathode inlet and $p_{sat}(T_{ref})$ is the water saturation pressure at a reference temperature.

\* \* \* \* \*